United States Patent [19]

Wojtowicz et al.

[11] 4,034,070
[45] July 5, 1977

[54] PROCESS FOR PREPARING ANHYDROUS METAL FLUORIDES

[75] Inventors: John A. Wojtowicz; David F. Gavin, both of Cheshire, Conn.

[73] Assignee: Olin Corporation, New Haven, Conn.

[22] Filed: Sept. 22, 1976

[21] Appl. No.: 725,898

Related U.S. Application Data

[63] Continuation-in-part of Ser. No. 597,546, July 21, 1975, abandoned.

[52] U.S. Cl. .............................. 423/489; 423/481; 423/258; 423/490
[51] Int. Cl.$^2$ ..................... C01B 7/08; C01F 5/28; C01G 1/06; C01G 43/06
[58] Field of Search ................... 423/489, 490, 481

[56] References Cited

UNITED STATES PATENTS

| | | | |
|---|---|---|---|
| 2,024,008 | 12/1935 | Midgley et al. | 423/489 |
| 2,924,508 | 2/1960 | Gilliland et al. | 423/489 |
| 3,565,700 | 2/1971 | Root | 423/490 |

OTHER PUBLICATIONS

C. A. Jacobson's "Encyclopedia of Chem. Reactions," vol. 8, 1959, Ed., pp. 37 & 38, Reinhold Pub. Corp., N.Y.

*Primary Examiner*—Edward Stern
*Attorney, Agent, or Firm*—F. A. Iskander; T. P. O'Day

[57] ABSTRACT

A process for preparing anhydrous metal fluorides is described wherein metal is reacted with HF and halogen in the presence of a nitrile.

10 Claims, No Drawings

PROCESS FOR PREPARING ANHYDROUS METAL FLUORIDES

This application is a continuation-in-part of application Ser. No. 597,546, filed July 21, 1975, now abandoned.

This invention relates to the preparation of metal fluorides. More particularly, the invention is directed to a simple but select process for preparing anhydrous metal fluorides.

Metal fluorides are used in a wide variety of applications including, for example, in the preparation of porcelain and pottery, in the dye industry, as constituents in various specialty glass formulations, as fluorinating agents, as antiseptics and as etching agents, particularly in the preparation of printed circuitry. The metal fluorides may also be used in thermal decomposition coating processes, as well as other coating methods such as in thin film optical coating techniques.

Pursuant to the invention, a simple method has been found for preparing anhydrous metal fluorides. Broadly speaking, this comprises reacting a metal with HF and a halogen in the presence of a nitrile. The reaction can be represented by the following equation

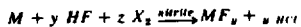

wherein M represents the metal reactant, y is an integer equal to the valence of the metal, z is a number equal to ½ y, and x represents halogen.

The metal reactant can be any one which will react with HF and halogen to form metal fluoride. This includes, for example, tin, antimony, lead, bismuth, magnesium, gallium and so forth. Other illustrations are the transition metals, e.g., titanium, vanadium, chromium, manganese, iron, cobalt, nickel, copper, zinc, molybdenum, mercury, uranium and the like. The method of the invention is particularly useful in preparing anhydrous fluorides of transition metals having an atomic number of less than 31.

Although the metal can be used in any physical form, e.g., large pieces, strips, granules, it is most efficient to utilize the subdivided or particulate form. For example, particles of one cubic millimeter or less in size are advantageously employed.

Desirably the HF reactant should be substantially anhydrous, i.e., containing less than 10% by weight of water, and preferably in completely anhydrous form, having a water content of less than 1% by weight.

The third reactant which is employed in the process of the invention is halogen, namely, chlorine, bromine, iodine or a mixture thereof. However, from a practical and economic standpoint, it is definitely preferable to employ chlorine. This also should be in substantially anhydrous, preferably completely anhydrous, form as defined above.

The amounts of halogen and HF that are used in effecting the reaction may be varied over a wide range. Usually, the amount of halogen ranges generally from about 0.05 to about 25, and preferably about 0.5–5, gram-moles per every gram-equivalent of the metal reactant. And the proportion of HF ranges generally from about 0.1 to about 50, and preferably about 1–10, gram-moles per every gram-equivalent of the metal.

A critical feature of the invention is that the reaction must be carried out in the presence of a nitrile. While any such material can be used, it is preferable, from a practical standpoint, to employ nitriles having 2–4 carbon atoms, including mixtures of two or more thereof. Illustrative are acetonitrile, propionitrile, butyronitrile and mixtures thereof. The use of acetonitrile, propionitrile or a mixture thereof is especially preferred, acetonitrile being most preferred.

As with the halogen and HF reactants, the nitrile should be substantially anhydrous and preferably in completely anhydrous form as defined above.

The nitrile serves as a catalyst for the reaction. Additionally, when used in sufficient amounts, the nitrile can also serve as a reaction medium or solvent. It is therefore readily apparent that the proportion of nitrile that is employed in the process of the invention may be varied over a wide range. Thus any suitable or convenient proportion may be used. Usually, this should not be less than about 1% of the combined weight of HF and nitrile. An illustrative range of proportions is from about 1 to about 99.9% of the combined weight of HF and nitrile. In actual practice a proportion ranging from about 2 to about 90, and preferably about 5–75, percent of the combined weight of HF and nitrile is advantageously used.

Any convenient order of mixing the reactants and the nitrile may be employed. For example, they may all be separately fed to a reaction vessel. Alternatively, the HF and nitrile may initially be mixed together, the nitrile serving as a solvent. Then the metal may be added followed by bubbling in the halogen, or the halogen may be added to the HF-nitrile mixture followed by the final addition of the metal.

The reaction can be effected at any suitable temperature, so that there is no real criticality with respect to the temperature necessary to bring about reaction. By way of illustration only, the reaction temperature may range from about 0° C to about 100° C, although higher as well as lower temperatures may be employed. However, as a matter of economy and convenience, it is preferable to operate at about room temperature. In certain instances, depending on the particular metal reactant that is used, the reaction may be highly exothermic and cooling may be necessary for proper reaction control and to avoid any detrimental effects on the product. In most instances, however, the reaction proceeds satisfactorily without the need for cooling means.

Neither is there any criticality in the pressure used to effect the reaction. Thus conveniently, atmospheric pressure may be employed. However, where the halogen is used in liquid form, it may be necessary or advantageous to employ elevated pressures, such as about 2–5 atmospheres or higher. When elevated pressure is employed, means should be provided to vent off by-product HCl.

It is thus apparent from the above, that the reaction can be effected using any combination of temperature and pressure provided there is no significant detrimental effect on either the reaction itself or on the metal fluoride product.

After the reactants and the nitrile are mixed together, the reaction usually proceeds spontaneously and quite rapidly, being often completed within a few seconds. The resulting product mixture, containing the metal fluoride, is usually a stable mixture. It therefore can be stored as such, if desired, until such time as the recovery or separation of the metal fluoride is desired.

Separation and recovery of the metal fluoride from the reaction product mixture can be achieved using any satisfactory, conventional technique. For example, filtration or distillation may be suitable depending on the particular metal fluoride produced. The ultimate product purity to be attained is usually a matter of choice depending on the intended field of utility.

The following examples are provided to illustrate the invention. In these examples, all parts and percentages are by weight unless otherwise specified.

EXAMPLE 1

About 20.8 grams (0.29 mole) of chlorine are dissolved in about 4.1 grams (0.10 mole) of acetonitrile and 15.4 grams (0.77 mole) of anhydrous HF. To this mixture are added 17.6 grams (0.3 mole) of powdered nickel. The reaction mixture is maintained at room temperature for about one half hour. A significant amount of a green solid is produced which is identified as $NiF_2$.

EXAMPLE 2

About 82 grams (2 moles) of acetonitrile are combined with about 20 grams (1 mole) of substantially anhydrous HF. To this mixture are added about 30 grams of a powdered alloy containing about 67% nickel, 28% copper, 2% manganese, 2iron, and very minor amounts of carbon, silicon, and sulfur. The reactants are maintained at a temperature of about 50° to about 60° C for 3 hours. Over this 3-hour period a total of about 30 grams (0.42 mole) of gaseous chlorine are bubbled into the reactants using helium as an inert carrier gas. The reaction product mixture is cooled and analyzed. Green solids present are found to contain $NiF_2$, $CuF_2$, $MnF_2$ and $FeF_3$.

EXAMPLE 3

About 71 grams (1 mole) of chlorine are dissolved in a mixture containing 55.1 grams (2 moles) of propionitrile and 40.4 grams (2.2 moles) of HF. To this is added a 200-gram strip of copper metal. Within about five minutes a substantial amount of whitish $CuF_2$ solid is obtained.

EXAMPLE 4

About 142 grams of chlorine, about 110 grams of acetonitrile and about 85 grams of substantially anhydrous HF are combined with about 80 grams of cobalt powder in a pressurized reactor being maintained at about 30 to 35atmospheres under agitation. The reactants are maintained at about 85° to 95° C for 15 minutes and then cooled to room temperature. Reddish solids are obtained which are determined to include $CoF_2$.

EXAMPLE 5

About 100 grams of chlorine are dissolved in a mixture of 130 grams of acetonitrile, 220 grams of anhydrous HF and 175 grams of powdered iron and maintained at room temperature for about 20 minutes. A greenish solid is obtained which is identified as a mixture of iron fluorides.

EXAMPLE 6

Example 5 is repeated except that 50 grams of a 50—50 mixture of powdered vanadium and chromium are substituted for the iron. A greenish solid product is obtained containing $CrF_2$, $CrF_3$ and $VF_3$.

EXAMPLE 7

Example 5 is repeated except that 50 grams of a 50—50 mixture of antimony and bismuth are substituted for the iron. A product mixture containing liquid fluorides and a grayish solid is obtained ($SbF_3$, $SbF_5$ and $BiF_3$).

EXAMPLE 8

Example 5 is repeated except that about 50 grams of an alloy of 50—50 tin and lead are used in place of the iron. The reaction mixture is maintained at about 35° to about 40° C for about 90 minutes and cooled to room temperature. A product is obtained containing $SnF_2$, $SnF_4$, and $PbF_2$.

EXAMPLE 9

Example 5 is repeated except that about 125grams of magnesium are substituted for the iron. A reaction product is obtained which contains $MgF_2$.

EXAMPLE 10

Example 5 is repeated except that about 140 grams of mercury are used in place of the iron. A yellowish substance is obtained which comprises $HgF_2$ and $Hg_2F_2$.

EXAMPLE 11

Example 5 is repeated except that about 160 grams of zinc are substituted for the iron. $ZnF_2$ product is obtained.

EXAMPLE 12

Example 5 is repeated except that about 150 grams of titanium powder are substituted for the iron. A light purplish powder is obtained which contains $TiF_3$ and $TiF_4$.

EXAMPLE 13

Example 5 is repeated except that about 180 grams of uranium are used in place of the iron. A greenish solid comprising $UF_4$ is obtained.

What is claimed is:

1. A process for preparing anhydrous metal fluoride which comprises reacting, in the presence of a nitrile having 2–4 carbon atoms, a metal with HF and halogen, both in substantially anhydrous form, said halogen being selected from the group consisting of chlorine, bromine, iodine and a mixture thereof, the reaction being carried out using, per every gram-equivalent of metal, about 0.1–50 gram-moles of HF and about 0.05–25 gram-moles of halogen.

2. The process of claim 1 wherein said nitrile is acetonitrile.

3. The process of claim 1 wherein said halogen is chlorine.

4. The process of claim 3 wherein said nitrile is acetonitrile, propionitrile or a mixture thereof.

5. The process of claim 4 wherein said nitrile is employed in a proportion that is equal to from about 1 to about 99.9 percent of the combined weight of said nitrile and said HF.

6. The process of claim 5 wherein per every gram-mole of said metal there are employed about 1–10 gram-moles of said HF and about 0.5–5 gram-moles of said chlorine.

7. The process of claim 6 wherein said metal is selected from the group consisting of a transition metal, magnesium, gallium, tin, antimony, lead and bismuth.

8. The process of claim 7 wherein each of said HF and chlorine contains less than 1 percent by weight of water.

9. The process of claim 8 wherein the proportion of said nitrile is from about 5 to about 75 percent of its combined weight with said HF.

10. The process of claim 9 wherein said nitrile is acetonitrile.

* * * * *